United States Patent [19]
Tamasi

[11] 3,744,046
[45] July 3, 1973

[54] ENGINE HEATER MONITOR AND CONTROL SYSTEM
[75] Inventor: Nick J. Tamasi, Des Moines, Iowa
[73] Assignee: Douglas Machinery Co., Des Moines, Iowa
[22] Filed: July 8, 1971
[21] Appl. No.: 160,602

[52] U.S. Cl. .......... 340/253 R, 219/205, 340/252 H
[51] Int. Cl. ............................................. G08b 19/00
[58] Field of Search ................... 340/248 R, 252 H, 340/253 R; 219/487, 497, 506, 202–208; 123/142.5 R, 142.5 E; 307/9, 10

[56] References Cited
UNITED STATES PATENTS

| | | | |
|---|---|---|---|
| 1,632,658 | 6/1927 | Manassero | 219/208 X |
| 3,312,967 | 4/1967 | Levine | 340/253 R |
| 2,819,373 | 1/1958 | Allman | 219/202 |
| 2,980,897 | 4/1961 | Meszaros | 340/248 B |

FOREIGN PATENTS OR APPLICATIONS 662,923 7/1938 Germany .................. 340/252 H Primary Examiner—John W. Caldwell
Assistant Examiner—Daniel Myer
Attorney—Chittick, Pfund, Birch, Samuels & Gauthier

[57] ABSTRACT

An engine heater system monitor for use on diesel truck tractors and the like connects a serial relay coil in the line to supply heater current and actuates the relay at a current level somewhat less than rated heater current. Three indicator lights are connected to indicate when the system is: (1) energized but not supplying heater current; (2) energized and supplying heater current; (3) energized on stand-by waiting for thermostat demand for heater current; and (4) deenergized.

2 Claims, 2 Drawing Figures

PATENTED JUL 3 1973        3,744,046

INVENTOR
NICK J. TAMASI

BY *Chittick, Pfund,
Birch, Samuels & Gauthier*

ATTORNEYS

ENGINE HEATER MONITOR AND CONTROL SYSTEM

BACKGROUND OF THE INVENTION

This invention relates to the monitoring and control of electrical circuits and more particularly to the visual indication of the condition of electric heater circuits.

Many heater current monitor and control systems are known in the prior art for indicating various operative and malfunction conditions of an associated power circuit. Generally, from multiple indications these arrangements are relatively complex resulting in a corresponding increase in cost and the possibility for malfunction of the various interrelated circuit components.

BRIEF SUMMARY OF THE INVENTION

The present invention is adapted to provide a unitary unit of simple and rugged construction which is capable of use under severe ambient temperature conditions to indicate completely the condition of an engine heater system by remote observation. It is generally the practice in cold winter climates to provide some auxiliary heating means for the engines of diesel truck tractors and the like when they are parked overnight or for extended periods of time during low temperature conditions. Where a number of such tractors are assembled under such conditions it is useful to have individual monitoring circuits which can be observed from a remote location with the indication giving full information concerning the condition of the heater circuit system. Because of the large number of such units needed in a typical staging area the element of economy and reliability become of paramount importance. In particular, each tractor should be provided with a monitor unit and the indications given by the unit should permit the whole fleet of tractors to be kept under surveillance with readily interpreted indications, not only of malfunction, but the positive indication that the heater system is operating as required in order that the fleet operator may be assured that all tractors are readily available for easy starting whenever required.

These objectives are achieved in the present invention by a monitor circuit which employs a series relay current coil which is matched to actuate switching contacts at a current level somewhat below the rated current level of an associated engine heater unit. This current level is considerably higher than the current required for the indicator lights which are used to give the indications of the condition of the system and, accordingly, the demand and interruption of heater current by an associated thermostat can be used in combination with the control relay actuation to indicate multiple conditions of operation. In particular, the present invention provides indication of the energized or deenergized condition of the heater whether or not power is available to the unit or has been interrupted due to some malfunction and whether or not the energized condition of the heater is related to malfunction or an interruption due to the demand condition of the thermostat.

Accordingly, it is the principle object of the present invention to provide an extremely rugged, simple and economical engine heater monitor and control system which requires a minimum of components and, accordingly, operates with high reliability while giving the maximum amount of indicated information, which indication are readily discernible from a remote location.

DESCRIPTION OF THE PREFERRED EMBODIMENT

Figure 1:
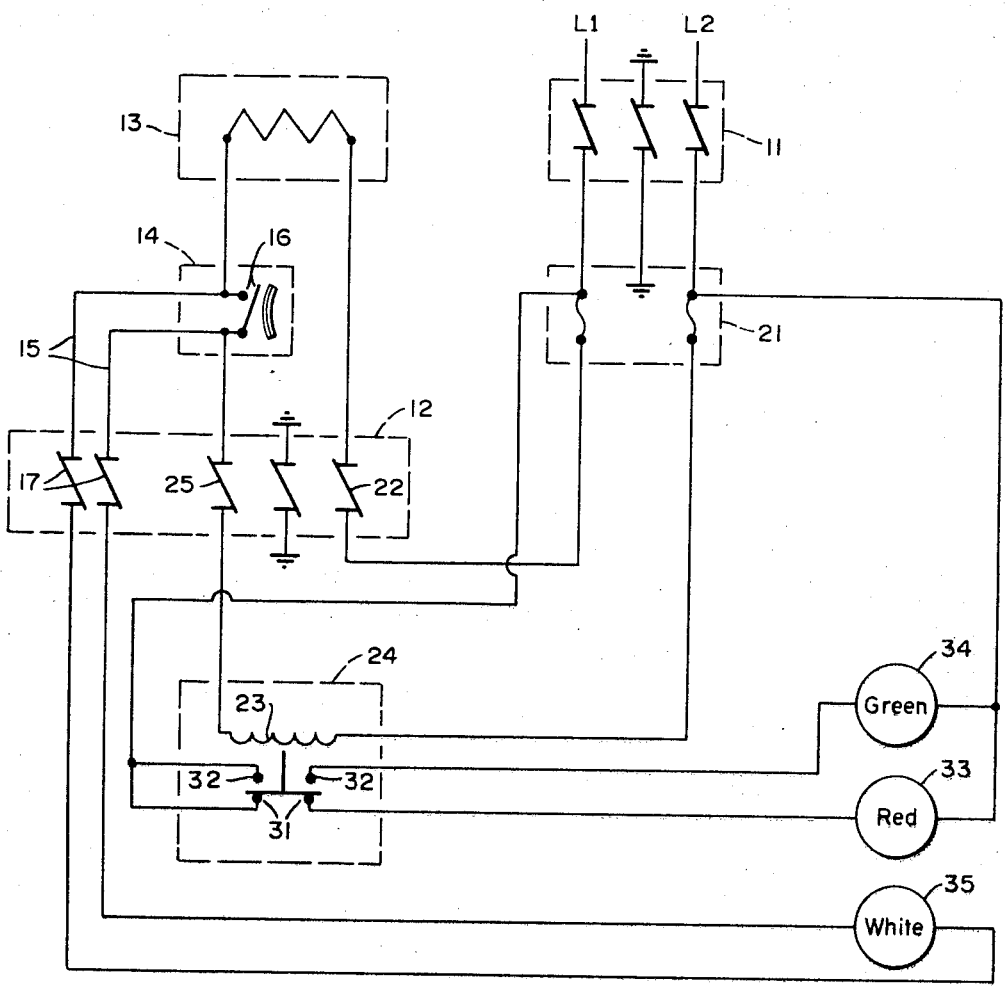
FIG. 1 is a schematic wiring diagram of the preferred circuit in accordance with the invention.

Referring to FIG. 1 the circuit of the monitor and control system will first be described. A line plug 11 is shown and may be of any conventional form for connecting to the line L1-L2 with a third terminal ground as indicated. A second disconnect plug 12 is provided for connecting the unit to an associated engine heater unit 13 which may be an oil dipstick heater or other conventional unit for warming the engine of an automotive vehicle or the like. If the heater 13 is to be thermostatically controlled a thermostatically controlled switch unit 14 is serially connected in one of the supply lines for the heater unit 13. In accordance with this invention the thermostat 14 is provided with leads 15 connected across the serially controlled contacts 16 of the thermostat 14. For this embodiment the leads 15 are also connected by disconnect contacts 17 associated with the plug 12.

The lines L1 and L2 are connected when plug 11 is engaged through a fuse box 21 and line L1 is fuse connected through contact 22 of plug 12 to the heater unit 13. Line L2 is fuse connected through current coil 23 of a relay 24 and through disconnect contacts 25 of plug 12 and thermostat contact 16 to the other terminal of the heater 13. The current coil 23 is preferably matched to the current rating of the heater 13 and in particular should energize the relay 24 to actuate its switching contacts from the deenergized condition when current flow through the coil 23 exceeds a value which is somewhat less than the rated current of the heater 13. For example, typical heaters 13 range between 750 and 2,500 watts and, accordingly, the coil 23 can be designed to actuate the relay when the current corresponding to approximately 700 watts is passing therethrough. For heaters 13 of lower current rating a corresponding reduction in the actuation current rating of relay 24 would be used. With this arrangement it is possible to use the circuit through the coil 23 for indicator current without actuating the relay 24 as hereinafter described.

The relay 24 has a set of normally closed contacts 31 and a set of normally open contacts 32. From the line side of fuse block 21, lines L1 and L2 are connected through normally closed contacts 31 to a red indicator lamp 33 and through normally open contacts 32 to a green indicator lamp 34. By taking the indicator circuit power from the line side of fuse block 21 the red indication of lamp 33 will be given for all conditions of no heater current including those due to blowing one of the line fuses in fuse block 21. In other words only the absence of line voltage at the plug 11 will result in no indication from the monitor unit and this absence of any indicator light being energized is perculiar to this one line outage fault condition.

When the heater 13 is drawing rated current which, as previously stated, is in excess of the actuating current for the coil 23 of relay 24, the normally open contacts 32 are closed and line voltage is supplied to the green indicator lamp 34 thus indicating that the heater 13 is receiving rated power. For undervoltage conditions or malfunction such as an open heater circuit the relay 24 will not be energized and the corresponding indication from red lamp 33 will so indicate the condition.

Where the heater 13 is provided with a thermostatic control 14 the contacts 16 open and close depending upon thermostat demand. When the contacts 16 are closed a short circuit appears across the lines 15 and when the thermostat contacts 16 open, line voltage appears across the lines 15 by virtue of the circuit which can be traced through the heater 13, plug 12 contact 22 to line L1 and through plug contact 25 of plug 12 through relay coil 23 to line L2. This line voltage appearing between lines 15 can be utilized for indicator purposes so long as the current drawn is less than the value of actuation current determined for coil 23.

An auxiliary thermostat indicator lamp 35 is provided for connection through contacts 17 to lines 15. With this circuit the lamp 35, which should have a distinguishing visual characteristic such as a distinct color relative to lamps 33 and 34 or a readily identifiable spatial arrangement relative to the other lamps, will be energized whenever the contacts 16 are open. The current requirements for lamp 35 are less than the actuation current level of the coil 23 for relay 24. Thus when the thermostat 14 demand is satisfied and contacts 16 open the current through relay coil 23 is interrupted and switch contacts 31 are closed while contacts 32 are opened. Thus the lamp 34 is extinguished and the lamp 33 is illuminated.

At the same time however the lamp 35 is illuminated so that the indication is red and white in the example given indicating to the operator that while the heater is not energized the reason for the condition is satisfaction of the thermostat demand and not malfunction. On the other hand, if only the red lamp 33 is illuminated the condition indicated is a closed set of contacts 16 for the thermostat 14, but the absence of heater current in the heater 13 even though the thermostat is demanding heater current thereby indicating malfunction. If the heater 13 is not equipped with a thermostat 14 the plug 12 will merely have blanks instead of lines 15 for connecting to contacts 17 and the white indicator lamp 35 will remain inoperative.

Figure 2:
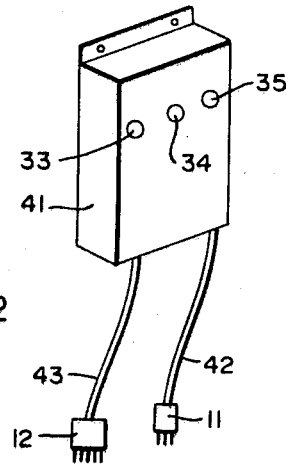
FIG. 2 is a perspective view of a truck tractor monitor unit in accordance with the invention.

Referring to FIG. 2, one arrangement suitable for housing the invention is indicated as providing a generally weatherproof housing 41 which can be mounted somewhere on the cab of a truck tractor in a position such that the unit can be visually observed from a remote position. For this purpose the lamps 33,34,35 can be arranged on the face of the unit and spaced so as to be readily observed from a distance. The plugs 11 and 12 may conveniently be provided at the end of service cords 42 and 43.

The operation of the invention will be apparent from the foregoing detailed description and will only be briefly reviewed here. The unit 41 is mounted at a suitable location on the tractor body for visual remote observation. The plug 11 is attached to suitable line voltage supply and the plug 12 is connected to a dipstick heater or similar standard heater unit for the tractor engine. If a thermostat 14 is provided the connection through contact 17 is included in the plug 12. Immediately upon connection of the unit the heater 13 is supplied current from the line and relay 24 is energized to indicate by illuminating green lamp 34 that heater current is being supplied. If a thermostat is employed the indication will be green if the thermostat demand is calling for heat and the indication will revert to the illumination of the red lamp 33 and white lamp 35 when the thermostat 14 is satisfied to open contact 16. If only red lamp 33 is illuminated the indication is that no heater current is flowing. If no lamps are illuminated the malfunction is indicated in the line supply itself or in plug 11.

The invention as described provides a simple and economical monitor that indicates all conditions of operation and with the use of a thermostat provides heater control and further operative condition indications. While the circuit has been shown in a relatively simple form, rearrangements are possible within the scope of the invention and, accordingly, the invention is to be considered to include such modifications as fall within the scope of the appended claims.

I claim:

1. An engine heater monitor system comprising:
   a unitary housing for said system adapted for mounting on a motor vehicle;
   an electric power circuit including first coupling means for connecting to an electric energy supply, second coupling means for connecting to an engine heater means, and a power circuit connection between said coupling means including current responsive switching means having a solenoid serially connected between said first and second coupling means and responsive to predetermined current level approximating the rated current of said heater means for actuating associated switching circuits; and
   indicator means energized from said supply through said switching circuits for indicating both conditions of current level above and below said predetermined level; said indicator means comprising a first lamp responsive to electric energy from said supply applied to said first coupling means through normally closed contacts of said switching circuits, a second lamp responsive to electrical energy from said supply applied to said first coupling means through normally open contacts of said switching circuits,
   whereby the conditions of energized but not supplying heater current, energized and supplying heater current and de-energized are visually indicated for remote observation.

2. An engine heater monitor unit comprising:
   a unitary housing for said said unit adapted to be mounted on a motor vehicle;
   a power plug for connecting to a line voltage source;
   a relay having normally open and normally closed switching contacts and a current coil for actuating said contacts at a predetermined current level;
   a heater plug for connecting to an engine heater unit;
   a line circuit connecting said power plug to said heater plug with said current coil serially connected in one line; first and second visually dissimilar indicator lamps; a circuit connecting line voltage from said power plug to
   said first indicator lamp through said normally closed contacts;
   a circuit connecting line voltage from said power plug to said second indicator lamp through said normally open contacts;

a third indicator lamp visually distinguishable from said first and second lamps and having rated current substantially below the rated current of a monitored engine heater; and a circuit for connecting said third indicator lamp across thermostatically controlled power contacts associated with said engine heater which said power contacts are in series circuit with said current coil;

said current coil being adapted to establish said predetermined current level somewhat less than said rated current for said monitored engine heater but not low enough to actuate said relay for rated current of said third indicator lamp;

whereby the conditions of energized but not supplying heater current, energized and supplying heater current, energized on stand-by waiting for thermostat demand and de-energized are visibly indicated for remote observation.

* * * * *